United States Patent
Pirzada et al.

(10) Patent No.: US 7,606,339 B2
(45) Date of Patent: Oct. 20, 2009

(54) INFORMATION HANDLING SYSTEM INCLUDING ADAPTIVE INTERFERENCE SUPPRESSION FEATURE AND METHOD OF OPERATION

(75) Inventors: Fahd Pirzada, Austin, TX (US); Kaushik Ghosh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 690 days.

(21) Appl. No.: 10/819,408

(22) Filed: Apr. 7, 2004

(65) Prior Publication Data

US 2005/0226356 A1 Oct. 13, 2005

(51) Int. Cl.
*H04B 7/216* (2006.01)

(52) U.S. Cl. ............... 375/350; 455/307; 708/301; 708/310; 708/314; 708/322

(58) Field of Classification Search ......... 375/232, 375/350; 370/332; 455/307; 708/300–323
See application file for complete search history.

(56) References Cited

U.S. PATENT DOCUMENTS

| | | | | |
|---|---|---|---|---|
| 4,730,343 | A * | 3/1988 | Kanemasa et al. | 375/233 |
| 5,226,057 | A * | 7/1993 | Boren | 375/350 |
| 5,400,371 | A * | 3/1995 | Natarajan | 375/240 |
| 5,422,912 | A * | 6/1995 | Asser et al. | 375/350 |
| 5,758,275 | A * | 5/1998 | Cox et al. | 455/307 |
| 5,890,057 | A | 3/1999 | Dutkiewicz et al. | |
| 6,035,213 | A * | 3/2000 | Tokuda et al. | 455/553.1 |
| 6,285,768 | B1 * | 9/2001 | Ikeda | 381/71.11 |
| 6,377,636 | B1 | 4/2002 | Paulraj et al. | |
| 6,714,775 | B1 | 3/2004 | Miller | |
| 6,724,840 | B1 | 4/2004 | Osofsky et al. | |
| 6,745,018 | B1 | 6/2004 | Zehavi et al. | |
| 7,206,564 | B2 * | 4/2007 | Yang et al. | 455/307 |
| 7,227,484 | B2 * | 6/2007 | Anderton et al. | 341/144 |
| 7,230,975 | B2 * | 6/2007 | Subrahmanya et al. | 375/148 |
| 2002/0006174 | A1 * | 1/2002 | Nafie et al. | 375/346 |
| 2004/0125771 | A1 * | 7/2004 | Subrahmanya | 370/332 |
| 2004/0196934 | A1 * | 10/2004 | Petrov et al. | 375/350 |

* cited by examiner

*Primary Examiner*—Shuwang Liu
*Assistant Examiner*—Michael R Neff
(74) *Attorney, Agent, or Firm*—Haynes and Boone, LLP

(57) ABSTRACT

An information handling system includes a wireless device and interference suppression apparatus that adapts to the different interference problems experienced by the wireless device when the system changes from one operating mode or state to another. The interference suppression apparatus includes a controller that instructs an adaptive filter with respect to the appropriate filter characteristics to employ to suppress interference when the system is operating in a first mode. When the system changes to a second mode of operation, the interference suppression apparatus updates the filter characteristics to filter characteristics which are appropriate for suppressing interference associated with the second mode of operation.

12 Claims, 3 Drawing Sheets

INFORMATION HANDLING SYSTEM INCLUDING ADAPTIVE INTERFERENCE SUPPRESSION FEATURE AND METHOD OF OPERATION

BACKGROUND

The present disclosure relates generally to information handling systems, and more particularly to a system and method for suppressing interference.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, communication of information by information handling systems is done through wireless means, which can help facilitate the portability of the information handling system. However, this wireless transmission and reception of information can raise a number of issues.

When communicating information wirelessly, a desire is to obtain an optimal signal to noise ratio (SNR). However, the transmitted power allowed for the signal is regulated by the government. This constrains wireless designers to reducing the interference level on the receive end to achieve a desired SNR. The interference level may be affected when unwanted signals are present in the fundamental receive or intermediate frequency bands, causing receiver desensitization, or desensing, which can degrade the potential range and throughput of the communications link.

Unwanted signals or interference can emanate from a number of sources in the information handling system. Processors, video cards, display devices, and even unshielded connection cables may be situated close enough to the communications antenna so that their radiated interference causes significant desensitization. Solutions to this problem exist, such as shielding cables to reduce interference, or relocating the antenna so that the desensitization is reduced. However, as the size of information handling systems continues to shrink, antenna relocation may no longer be a viable option because there may be no antenna locations in the system which avoid a desensing problem.

Modulation techniques exist which tend to mitigate some of the harmful effects of interference. These techniques can guarantee a bit error rate, but will lose some information as they can only deliver a certain robustness and don't actually decrease the interference level.

Accordingly, it would be desirable to provide a system and method for improved interference suppression in an information handling system absent the disadvantages found in the prior methods discussed above.

SUMMARY

Accordingly, in one embodiment, an information handling system (IHS) is disclosed including a processor and a wireless device coupled to the processor. The IHS also includes a controller, coupled to the processor, operable to determine when the IHS changes mode of operation. The IHS further includes an adaptive filter, coupled to the wireless device, operable to employ first filter characteristics when the IHS is operating in a first mode and to employ second filter characteristics when the IHS is operating in a second mode. In this manner, the IHS can filter out undesired interference even though the interference changes when the IHS changes from mode to mode.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
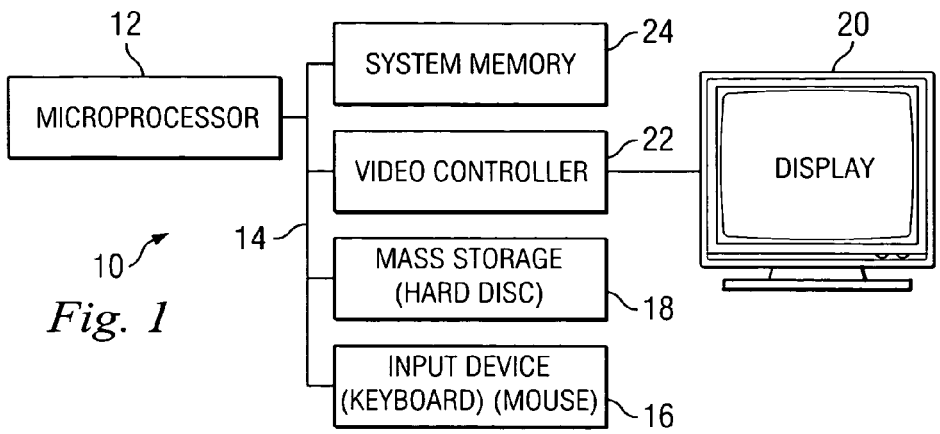
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Information handling system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
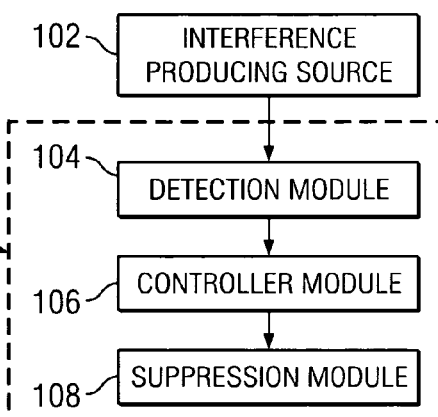
FIG. 2 is a schematic view illustrating an embodiment of an interference suppression system.

An interference suppression system 100, FIG. 2, is coupled to an interference producing source 102 in an information handling system such as information handling system 10 shown in FIG. 1. Interference producing source 102 may be a single source or a plurality of sources and may include a plurality of interference producing components. A common interference source is the processor of an information handling system. It is noted that the radio frequency (RF) interference caused by a processor typically changes when the processor's clock frequency is reduced from a first clock frequency to a second clock frequency in an effort to conserver power. Interference suppression system 100 includes a detection module 104, a controller module 106 coupled to detection module 104, and a suppression module 108 coupled to controller module 106. Detection module 104 is coupled to interference producing source 102 and monitors the operating conditions of interference producing source 102. Detection module 104 recognizes when interference producing source 102 undergoes a state or mode change and, in response, transmits state or mode change information to controller module 106. For purposes of this disclosure, the terms "mode" and "state" will be used synonymously. State change information may include information with respect to which interference producing source or which component of the interference producing source has changed state. State change information may also include information with respect to what state the source has changed. Controller module 106 is coupled to detection module 104 to receive state change information, and may transmit suppression information with the help of an interference profile. An alternative embodiment is possible in which the detection module and the control module are combined.

An interference profile is a profile of the interference producing source in an information handling system and includes suppression information that is necessary to suppress interference produced by the interference producing source when it operates in different states. An interference profile can be determined a number of ways. For example, interference profile determination can begin by determining the sources of interference in a system. For each interference source, the interference produced under different operating conditions can be measured and recorded. If the interference source is the processor, the interference may be measured and recorded with the processor in high power mode, typically a high clock frequency, and with the processor in low power mode, typically a lower clock frequency. Once the interference sources have been identified, the interference produced by the sources can be quantized using different techniques, such as characterizing the power spectrum density or peak spectral harmonics of the interference which fall in the desired signal bandwidth. Using Fast Fourier Transforms on signal samples and recording all the frequencies at which the power exceeds a certain threshold can help identify the interference frequency concentration. A correlation can then be established between the interference characteristics and the particular filtering coefficients required to suppress that interference. These filtering coefficients form part of a corrective interference profile associated with suppressing interference from a particular interference source operating in a particular mode or state. At present, it is inefficient to characterize interference in real-time to determine the corrective filtering coefficients because it requires intensive processor utilization. This problem can be solved by predetermining the corrective interference profile of a system, after which only interference producing source state changes need to be monitored in order to suppress interference. Suppression module 108 is coupled to controller module 106 to receive suppression information and suppress interference.

Figure 3:
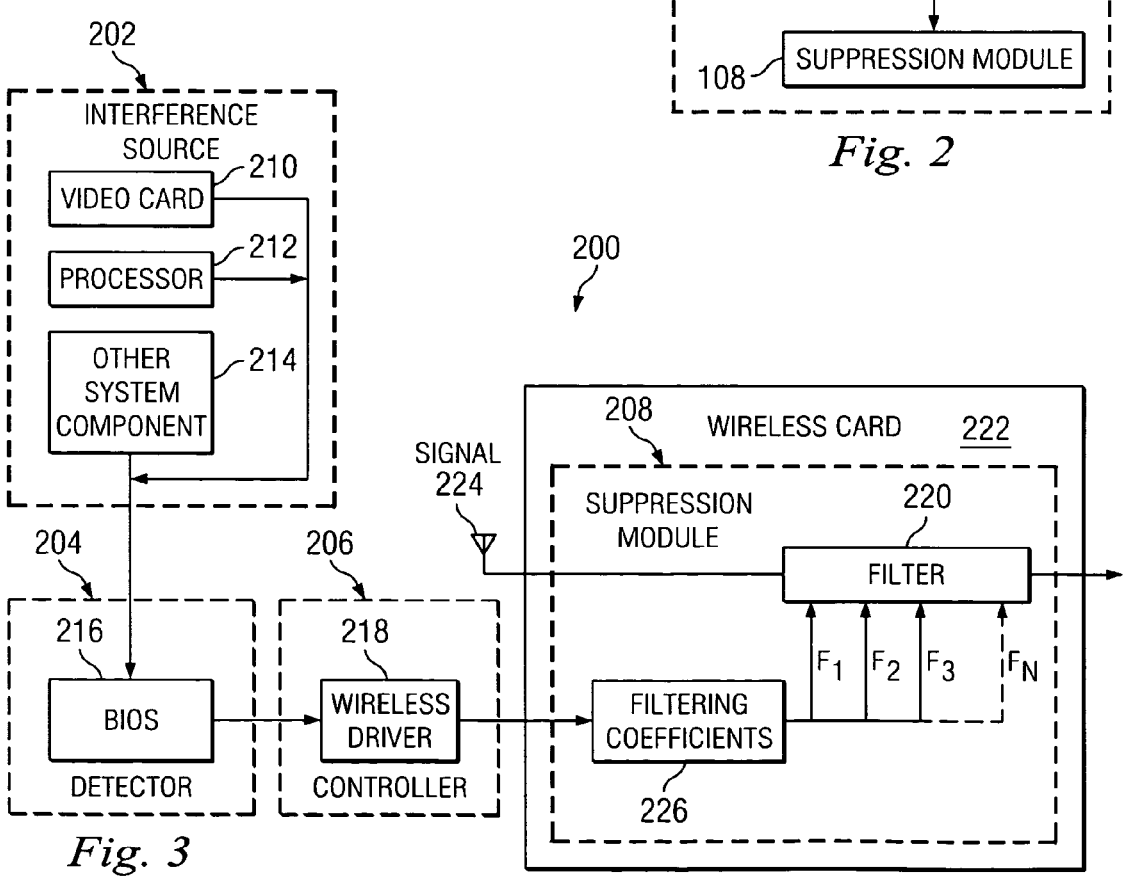
FIG. 3 is a schematic view illustrating another embodiment of an interference suppression system.

In another embodiment, an interference suppression system 200, FIG. 3, includes an interference producing source 202 in an information handling system such as information handling system 10 shown in FIG. 1. Interference suppression system 200 also includes a detection module 204, a controller module 206 coupled to the detection module 204, and a suppression module 208 coupled to the controller module 206.

Interference producing source 202 includes a video card 210, a processor 212, and other system components 214. Other system components 214 may be a variety of components that exist in an information handling system, including an unshielded connection cable or a LCD inverter. Detection module 204 is coupled to the interference producing source 202 and includes a basic input-output system (BIOS) 216 that monitors the operating conditions of the interference producing source 202 such as the processor speed or clock frequency, the condition of the video card, and the functioning of a display. BIOS 216 can transmit state change information when it detects the interference producing source 202 has gone through a stage change, such as the processor switching from a high power mode to a low power mode. Controller module 206 is coupled to detection module 204 and includes a wireless driver 218. The wireless driver 218 can receive the state change information from the BIOS and transmit suppression information with the help of an interference profile. Suppression module 208 is coupled to controller module 206, includes a filter 220, and may exist on a wireless card 222. Filter 220 receives suppression information in order to suppress interference in a signal 224 and can be a variety of filters including tunable multi-notch filters such as finite impulse response (FIR) notch filters or infinite impulse response (IIR) notch filters. Filter 220 may be an analog or digital filter. Signal 224 is supplied to filter 220 on suppression module 208.

In operation, BIOS 216 detects when components of interference producing source 202 change state and relays state change information to wireless driver 218. Wireless driver 218 determines from the interference profile the proper suppression information needed to suppress interference produced by the particular interference producing source state change. Wireless driver 218 then transmits the suppression information which may include a plurality of filtering coefficients 226 ($F_1, F_2, F_3 \ldots F_N$) or information related to which particular filtering coefficients 226 are necessary to suppress the particular interference. The filtering coefficients 226 are then received by filter 220 which commences filtering signal 224 according to these filtering coefficients to suppress interference from interference producing source 202. It is noted that the disclosed interference suppression apparatus and method is adaptive because it can change or adapt to the different interference experienced when the IHS changes state, for example from a high power/high clock frequency mode to a lower power/lower clock frequency mode. More particularly, filter 220 of suppression module 208 is adaptive because its interference filtration characteristics are changed or adapted to filter out interference when the IHS changes state. When the IHS is operating in a high power/high clock frequency mode, a first group of filter coefficients 226 ($F_1$, $F_2$, $F_3 \ldots F_N$) are applied to filter 220. When the IHS then changes state to a lower power/lower clock frequency mode, the system adapts and sends a new second set of filter coefficients 226 ($F_1$, $F_2$, $F_3 \ldots F_N$) which filter out the changed interference associated with the processor operating in the current lower power mode.

It is noted that wireless card 222 need not necessarily take the form of a plug-in card. Wireless card 222 can also be a wireless module exhibiting a different shape than a card. Moreover, the circuitry and functionality associated with wireless card 222 can alternatively be integrated within the information handling system.

Figure 4:
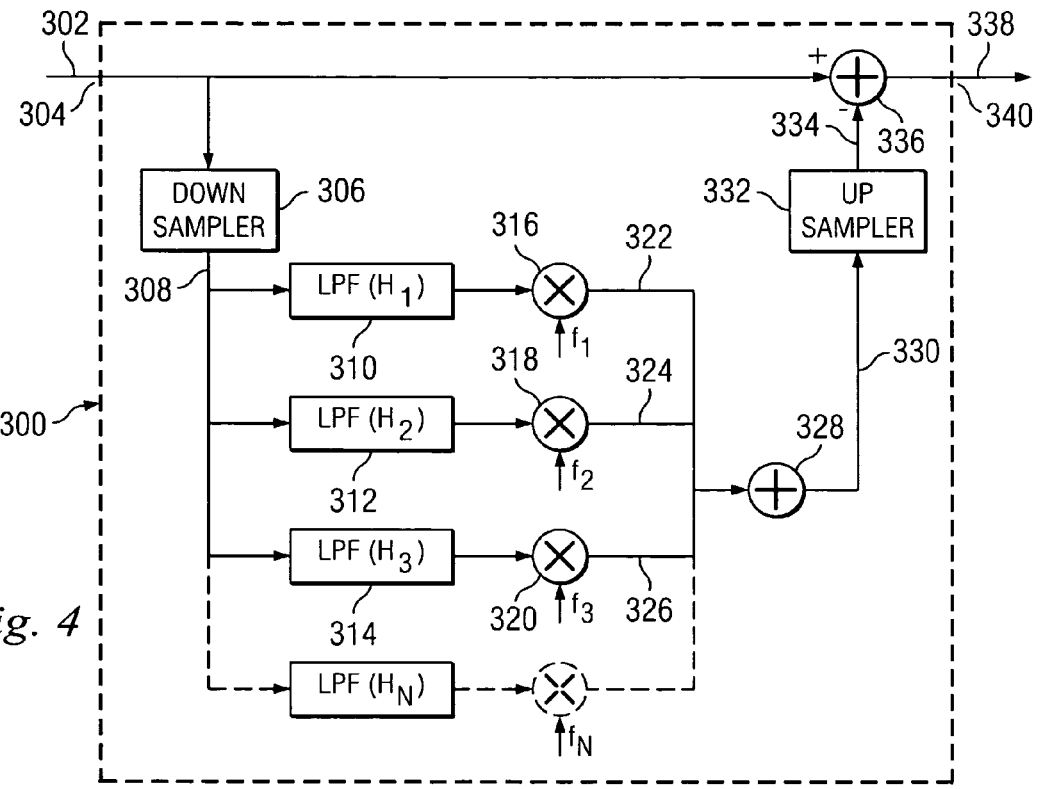
FIG. 4 is a schematic view illustrating an embodiment of a digital filter in an interference suppression system.

FIG. 4 is a schematic diagram of a digital filter 300 which may be used as filter 220 of FIG. 3. Digital filter 300 uses digital signal processing techniques to produce a filtered signal. For example, the original signal 302, which may be signal 224 in FIG. 3, enters the filter 300 in digital format at input 304. A down-sampler 306 may down-sample the original signal 302 to create down-sample 308. The filtering operation may be executed without down-sampling and the corresponding up-sampling, but down-sampling may be used to reduce computation complexity and with it, substantial processor utilization. Down-sample 308 may then be filtered through a plurality of filters such as low pass filters 310, 312, and 314 each of which may filter a component of the interference producing source and act to isolate the interference in the down-sampled signal. The filtering coefficients for the respective filters are set using the interference profile, which includes information regarding the interference producing source in various bands and its corresponding intensity. The filtering coefficients are provided to the filters to obtain the optimum attenuation in a specific band. The filtered down-sample signals may then be mixed by mixers 316, 318, and 320 with the frequencies of their respective components of the interference producing source to produced down-filtered interference signals 322, 324, and 326. Down-filtered interference signals 322-326 are then accumulated by accumulator 328 to create an aggregate interference signal 330 representing all the components of the interference producing source. Aggregate interference signal 330 is then up-sampled by up-sampler 332 to create up-sample 334 which corresponds to the original signal 302. Up-sample 334 is then subtracted by subtractor 336 from the original signal 302 to produce a filtered signal 338 which is supplied to filter output 340.

Figure 5:
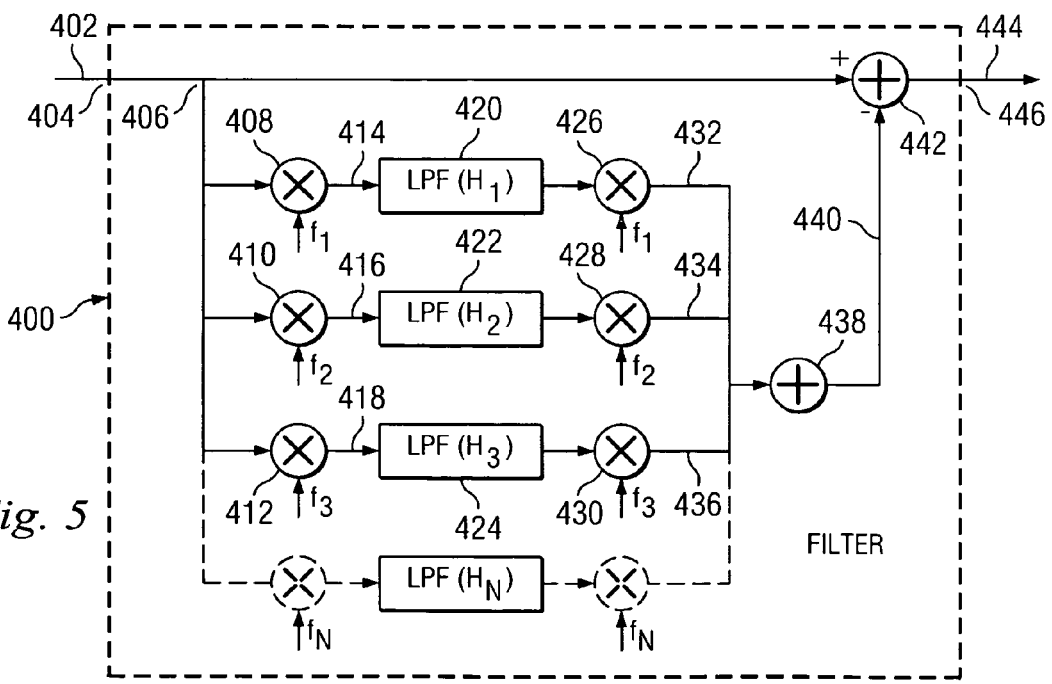
FIG. 5 is a schematic view illustrating an embodiment of an analog filter in an interference suppression system.

FIG. 5 is a schematic diagram of an analog filter 400 which may be used as the filter 220 of FIG. 3. Analog filter 400 uses analog components that are tuned to certain frequencies to produce a filtered signal. For example, the original signal 402, which may be signal 224 in FIG. 3, enters the filter 400 in analog format at input 404. From node 406 the original signal 402 may be, for each component of the interference producing source, mixed with a local oscillator signal at the frequency of the component by mixers 408, 410, and 412 to produce mixed signals 414, 416, and 418. The mixed signals 414-418 may then be filtered through a plurality of filters such as low pass filters 420, 422, and 424 to remove all the signals except those of the component of the interference producing source. The filtering coefficients for the respective filters have been determined using the interference profile, which includes information with respect to the interference producing source in various bands and its corresponding intensity. The filtering coefficients are provided to the filters to obtain the optimum attenuation in a specific band. The filtered signals may then be mixed by mixers 426, 428, and 430 with the frequencies of their respective components of the interference producing source to produced interference signals 432, 434, and 436. Interference signals 432-436 are then accumulated at accumulator 438 to create an aggregate interference signal 440 representing all the components of the interference producing source. Aggregate interference signal 440 is then subtracted by subtractor 442 from the original signal 402 to produce a filtered signal 444 which is supplied to filter output 446.

Figure 6:
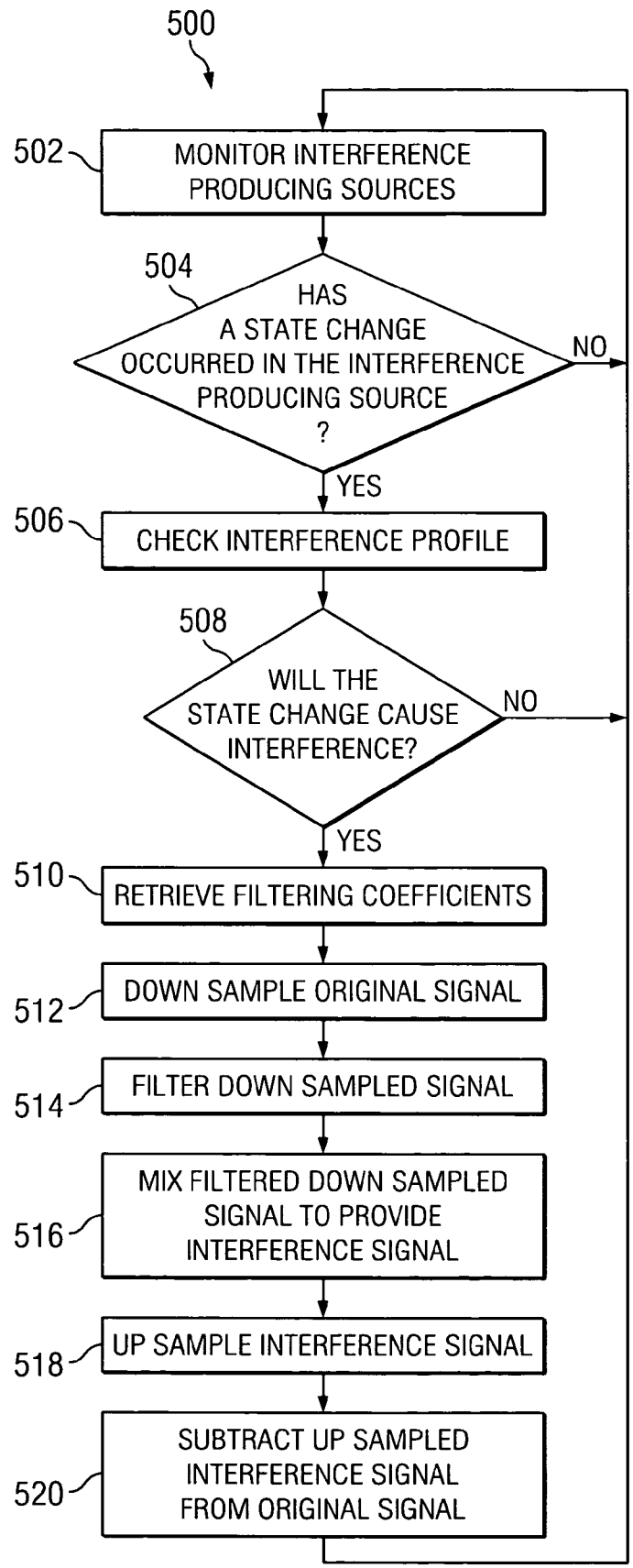
FIG. 6 is a flowchart for a method of interference suppression.

FIG. 6 is a flow chart depicting a method for interference suppression 500 which can be used in interference suppression system 100 of FIG. 2 or interference suppression system 200 of FIG. 3. Method 500 begins at block 502 where interference producing sources are monitored. The method then proceeds to decision block 504 to determine whether a state change has occurred in an interference producing source. If no state change has occurred, the method returns back to block 502 to monitor the interference producing sources.

If a state change has occurred, the method proceeds to block 506 where the interference profile is checked. The method then proceeds to decision block 508 to determine from the interference profile whether the state change will cause interference. If the state change will not cause interference, the method returns back to block 502 to monitor the interference producing sources. If the state change will cause interference, the method proceeds to block 510 to retrieve the filtering coefficients necessary to suppress the interference. Once the filtering coefficients are retrieved, a down-sample of the original signal in the desired frequency band is made at block 512. Using the filtering coefficients retrieved at block 510, the down-sampled signal is filtered at block 514 to isolate interference in the down-sampled signal. The method then proceeds to block 516 where the down-sampled signal is mixed with the frequency of the source of interference to provide an interference signal. The interference signal is then up-sampled at block 518, and the up-sampled interference signal is subtracted from the original signal at block 520. The method then returns to block 502 to monitor the interference producing sources while continuing to subtract the up-sampled interference signal from the original signal until another state change occurs that will modify the interference in the system.

The disclosed interference suppression methodology and apparatus may be used in many different types of information handling system (IHSs) in which wireless technology is employed. By way of example and not limitation, the disclosed methodology and apparatus may be employed in both large and small form factor computer systems, laptop and notebook computers, personal digital assistants (PDA's), tablet computers, mobile telephones, wireless handheld email terminals and other information handling systems employing wireless technology. Moreover, the disclosed interference suppression technology can be applied to IHSs using several different types of wireless technology. For example, IHSs using IEEE 802.11(a), IEEE 802.11(b), IEEE 802.11(g), IEEE 802.16, IEEE 802.x, Bluetooth, as well as many other wireless technologies can benefit from the disclosed interference suppression technique.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of operating an information handling system (IHS) including a wireless device that is coupled to the IHS, comprising:
predetermining a corrective interference profile that comprises filter characteristics, wherein the predetermining comprises:
measuring a first interference of a processor that is located in the IHS when the processor is operating in a first power mode, wherein first filter characteristics are determined using the first interference; and
measuring a second interference of the processor that is located in the IHS when the processor is operating in a second power mode, wherein second filter characteristics are determined using the second interference;
providing a wireless signal through the wireless device subsequent to the predetermining of the corrective interference profile;
detecting when the processor changes mode of operation from the first power mode to the second power mode;
filtering the wireless signal by an adaptive filter employing the first filter characteristics when the processor is operating in the first power mode, wherein the adaptive filter receives the wireless signal, modifies the wireless signal using the first filter characteristics to provide a modified wireless signal, and subtracts the modified wireless signal from the wireless signal to create a filtered signal; and
filtering the wireless signals by the adaptive filter employing the second filter characteristics when the processor is operating in the second power mode, wherein the adaptive filter receives the wireless signal, modifies the wireless signal using the second filter characteristics to provide a modified wireless signal, and subtracts the modified wireless signal from the wireless signal to create a filtered signal.

2. The method of claim 1 wherein the processor operating in the first power mode corresponds to the processor operating at a first frequency.

3. The method of claim 2 wherein the processor operating in the second power mode corresponds to the processor operating at a second frequency.

4. The method of claim 1 wherein the adaptive filter is a tunable multi-notch filter.

5. The method of claim 1 wherein the adaptive filter is a FIR filter.

6. The method of claim 1 wherein the adaptive filter is integral to the wireless device.

7. The method of claim 1 wherein the first filter characteristics include first filter coefficients.

8. The method of claim 1 wherein the second filter characteristics include second filter coefficients.

9. The method of claim 1 further comprising:
determining, by a basic input output system (BIOS) of the IHS, a present power mode of the processor to establish when the processor changes mode.

10. The method of claim 1 including providing a wireless driver including the first and second filter characteristics.

11. The method of claim 1 wherein the adaptive filter is a digital filter.

12. The method of claim 1 wherein the adaptive filter is an analog filter.

* * * * *

UNITED STATES PATENT AND TRADEMARK OFFICE
CERTIFICATE OF CORRECTION

PATENT NO. : 7,606,339 B2  Page 1 of 1
APPLICATION NO. : 10/819408
DATED : October 20, 2009
INVENTOR(S) : Pirzada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Fourteenth Day of December, 2010

David J. Kappos
*Director of the United States Patent and Trademark Office*